United States Patent [19]
Tarassoff et al.

[11] 3,808,524
[45] Apr. 30, 1974

[54] APPARATUS FOR DETERMINING THE AMOUNT OF MAGNETIC MATERIAL IN A SAMPLE

[75] Inventors: Peter Tarassoff, Dollard Des Ormeaux, Quebec; Frank Kitzinger, Montreal, Quebec, both of Canada

[73] Assignee: Noranda Mines Limited, Toronto, Ontario, Canada

[22] Filed: June 13, 1972

[21] Appl. No.: 262,213

[30] Foreign Application Priority Data
Apr. 20, 1972   Canada .............................. 140193

[52] U.S. Cl. ............................................. 324/34 R
[51] Int. Cl. .......................................... G01r 33/12
[58] Field of Search ........... 324/34 R, 13, 41, 61 TI, 324/82; 330/110

[56] References Cited
UNITED STATES PATENTS

| | | | |
|---|---|---|---|
| 2,613,249 | 10/1952 | Babb | 324/61 TI |
| 2,765,330 | 10/1956 | Kirshenbaum | 324/34 R |
| 3,036,267 | 5/1962 | Semelman | 324/34 R |
| 3,193,771 | 7/1965 | Boatwright | 330/110 |
| 3,344,350 | 9/1967 | Stoft | 324/82 |
| 3,400,331 | 9/1968 | Harris | 324/61 TI |
| 3,448,375 | 6/1969 | Bennier | 324/34 R |
| 3,649,909 | 3/1972 | Ort et al. | 324/82 |

FOREIGN PATENTS OR APPLICATIONS

| | | | |
|---|---|---|---|
| 597,705 | 2/1948 | Great Britain | 324/34 R |
| 1,804,389 | 7/1970 | Germany | 330/110 |

Primary Examiner—Robert J. Corcoran
Attorney, Agent, or Firm—Fleit, Gipple & Jacobson

[57] ABSTRACT

An apparatus is provided for measuring the magnetic content of a material. Basically, the apparatus comprises a sine wave oscillator with an oscillator coil forming part of its circuit. A sample is placed within the coil and produces a frequency shift $\Delta f$ which is proportional to the magnetic content of the sample. This frequency shift is measured by electronic means. The apparatus is compact, rugged and accurate and may be operated both on a line supply power or on batteries.

3 Claims, 8 Drawing Figures

APPARATUS FOR DETERMINING THE AMOUNT OF MAGNETIC MATERIAL IN A SAMPLE

BACKGROUND OF THE INVENTION

1. Field of the Invention

This invention relates to an apparatus for the determination of magnetic compounds in ores, calcines, metallurgical slags and the like. More particularly, the invention provides a portable apparatus having a solid state circuit for measurement of magnetic susceptibility.

2. Description of the Prior Art

Several methods and devices are known for determining magnetic compounds such as magnetite, pyrrhotite and the like in a sample. The chemical methods such as the Kinnunen method (Kinnunen, J., "Rapid Determination of Magnetite in Copper Slags and Mattes," The Chemical Analyst, 40 No. 4, 89–92, 1951) are considered to be somewhat more reliable than the electrical devices because the results obtained thereby are usually more accurate. However, such methods are rather time consuming since the sample must be crushed, taken to the laboratory and subjected to a lengthy analytical procedure. Thus, the results usually become available only a few days later by which time they are more of historical interest than of immediate use. This, of course, in many instances is unacceptable, particularly if some adjustments in the overall process are needed to maintain the magnetic material at a certain predetermined level, as for instance in the case of some pyrometallurgical operations in which the magnetite content of the slag is used as a relative measure of the state of oxidation of the slag. The chemical methods are also quite expensive when many measurements are required.

To obviate these disadvantages, a number of instruments are known which provide a direct reading of the magnetite content of the sample. These instruments are based on two basic principles:

1. The sample is placed in a coil arrangement thereby causing a voltage or power unbalance which is proportional to the magnetic susceptibility of the sample (cf Shandley, P.D., and Bacon, L.O., "Analysis for Magnetite Utilizing Magnetic Susceptibility," Geophysics, 31, No. 2, 398–409, 1966; and U.S. Pat. No. 3,535,619 issued Oct. 20, 1970 to H.W. Franz et al. for "Shell-Type Transformer Instrument for Determining the Amount of Magnetic Material in a Substance wherein a Sample of the Substance Functions as the Center Leg of the Transformer.")

2. The sample is weighted first in a magnetic field sufficiently strong to cause its magnetic saturation and then in the absence of the field, the ratio of these fields being proportional to the magnetic content of the sample. This is the so-called "saturation magnetization method" (cf "Outokumpu Company Develops Two Magnetic Measuring Instruments," World Mining, 18, No. 11, 42–43, 1965; and Schickel, A., "A Magnetic Balance for the Measurement of Ore Concentrates,"- Freiberger Forschungsh., A358, 61–81, 1965).

These known instruments possess however several important drawbacks. First of all, they are rather complex in nature and consequently expensive. They are usually delicate and can be operated only by experts. Most of them are insufficiently rugged and ill adapted to field use. Moreover, most require line voltage for operation which is not consistent enough to obtain reproducible measurements. The sine wave is distorted by various inductive loads and often includes transients from scr controls, motors, etc. These and the voltage variations invariably upset any AC bridge circuit causing unpredictable inaccuracies.

In most known electrical devices, the operating frequency has an important effect on the measurement which again leads to unreliability if such frequency is varied, and there is no way to optimize the measurement for a particular material, such as magnetite, pyrrhotite, etc.

In most cases, the known devices use rectifier diodes, the well known non linearity of which distorts the calibration curve. Also, the resistance of measuring transformer coils changes with increasing temperature after the instrument has been turned on. This effect is even worse under plant conditions where variations in the ambient temperature and heat radiation from the furnaces will cause a strong shift in sensitivity, requiring frequent recalibrations.

SUMMARY OF THE INVENTION

The object of the present invention is to provide a fully electronic, solid state circuit which will obviate the above-mentioned disadvantages at least to a very great extent and wherein the magnetic susceptibility of the sample is measured using an entirely different principle.

Another object is to provide an apparatus which is compact, rugged and can easily operate on batteries as well as line power. Such apparatus is consequently very suitable for field use.

Still another object is to provide an apparatus which, in spite of its simplicity and ruggedness, will produce accurate and reliable results comparable to those generally obtained by chemical methods.

Other objects and advantages of the present invention will be evident from the following more detailed description.

Basically, the new apparatus uses a shift in frequency $\Delta f$ of a measuring frequency oscillator and measurement thereof by electronic means to obtain the magnetic content of a sample. It should be noted that the magnetic effect of the sample shifts the frequency of an oscillator by a $\Delta f$ value which is a linear function of the magnetic content within a reasonably wide range. The operating frequency is determined by a plug-in printed circuit board, which method allows the frequency to be readily changed if desired. A direct reading frequency meter may be calibrated in "percent magnetite." The temperature has practically no effect on the measurement particularly when military specification integrated circuits and other components are used. Battery operation provides excellent portability of the instrument. A further advantage of this apparatus is that the meter can be replaced by an inexpensive digital counter since the information is already available in frequency form. This makes the instrument even more rugged. Finally, the size of the apparatus according to the present invention is about one third of those known in the art and the whole apparatus only weighs about 5 lb.

Generally speaking, the apparatus according to the present invention comprises a measuring frequency oscillator, an oscillator coil forming part of the measuring frequency oscillator circuit and adapted to receive the sample therewithin, and electronic means for measuring the frequency shift $\Delta f$ of the oscillator caused by the magnetic effect of the sample. These electronic means for measuring the frequency shift $\Delta f$ usually comprise: a reference frequency oscillator; a mixer circuit into which sine wave signals from both the measuring frequency oscillator and the reference frequency oscillator are fed; a low pass filter into which the signal from the mixer circuit is fed for reducing traces of the original oscillator frequencies; and means for measuring the filtered differential frequency.

The reference frequency oscillator provides a fixed reference frequency that is exactly equal to the basic frequency of the measuring oscillator prevailing when no sample is placed within the coil. Also, the reference frequency oscillator may be manually tunable by means of a calibrated dial to balance the frequencies of the two oscillators.

The filtered differential frequency from the low pass filter can be measured directly by means of a digital counter or it can be converted to a voltage signal and measured with an analog or digital voltmeter. The counter or voltmeter can be calibrated to read directly in equivalence of magnetic material, or a separate calibrating chart may be used.

In another embodiment of the present invention, the electronic means for measuring the frequency shift $\Delta f$ may consist of a phase-locked loop integrated circuit. Such phase-locked loop circuits have been used for years in satellite tracking devices and other expensive instruments. They were expensive because of the large number of components required. However, the circuit has recently become available in integrated circuit form in a five-sixteenths inch diameter package. It is also very inexpensive. This device enables simplification of the circuitry of the overall apparatus without sacrificing performance and at reduced overall cost.

The basic principle of the apparatus using the phase-locked loop integrated circuit is the same as mentioned above, that is the frequency of a measuring oscillator is shifted by the magnetic effect of the sample and the measurement of this frequency shift is carried out by the phase-locked loop which is connected to an analog or digital voltmeter that may be desirably calibrated.

The measuring coil in the apparatus of the present invention may be designed to accommodate unusually small samples or unusually large samples or it can be designed for use in drill holes, etc.

BRIEF DESCRIPTION OF THE DRAWINGS

The novel apparatus will now further be described with reference to the appended drawings in which.

DESCRIPTION OF THE PREFERRED EMBODIMENTS

Figure 1:
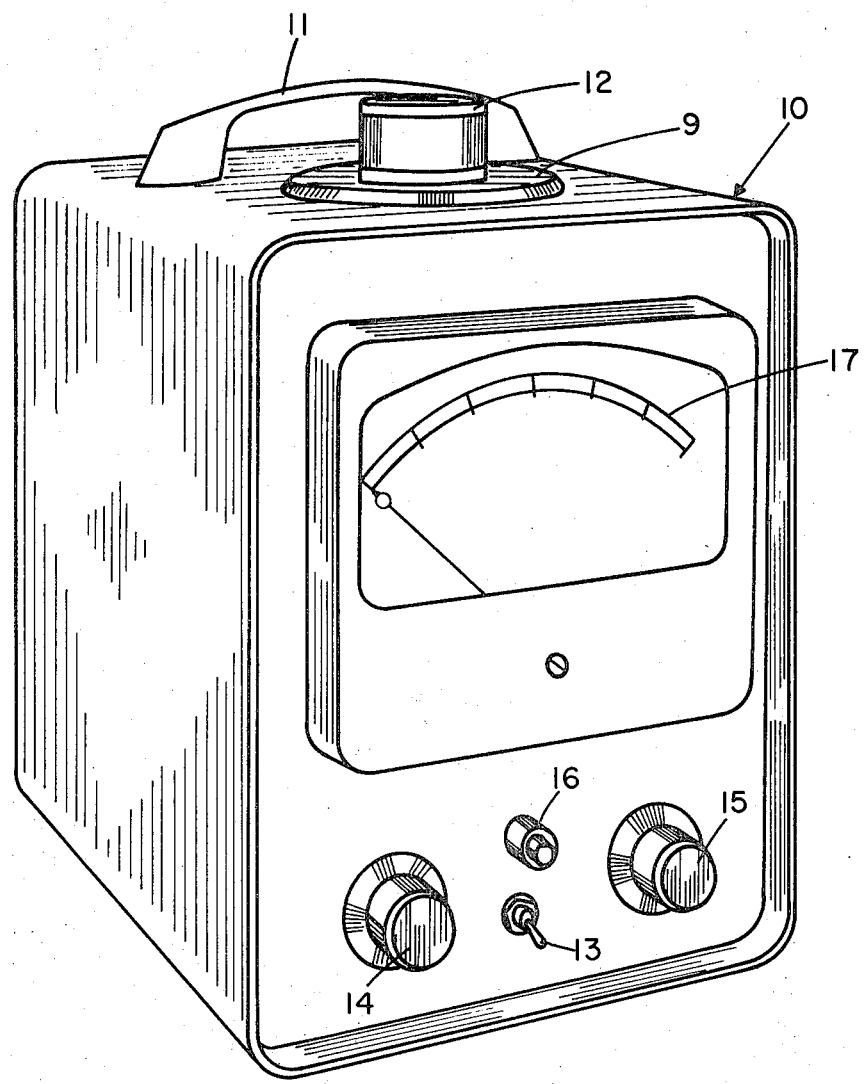
FIG. 1 is an illustration of the apparatus according to the present invention as it looks in the fully assembled condition.

As illustrated in FIG. 1, the apparatus 10 of the present invention, when fully assembled, has a compact and rugged form and is provided with a handle 11 to make it easily portable. To operate the apparatus, the power switch 13 is switched on and about 1 minute should be allowed for the apparatus to warm up. The pilot light 16 indicates that the power is on. With the sample holder 9 empty, the meter 17 is set to read zero by turning the zeroing dial 14. The calibration standard 12 is then placed in the sample holder 9. The meter 17 is set to read the equivalent magnetic material content of the calibration standard by turning the calibration dial 15. The calibration standard is removed, and replaced by the sample in the form of a powder, rod or the like. The equivalence of magnetic material can then be read directly on the meter 17, for example, as a percentage of magnetic material in the sample.

The magnetic susceptibility of magnetic compounds such as magnetite, pyrrhotite and the like is known to be different, and therefore a separate calibration standard 12 is provided for each different material.

It should, of course, be understood that most accurate and reproducible readings depend on the quantity of the sample used each time within the measuring coil, the specific gravity thereof or its bulk density if it is in powder form. These, however, are normal parameters and careful sample preparation as well as consistent procedure will give entirely satisfactory results comparable to those obtained by chemical methods. For example, the samples should normally be ground to the same mesh (preferably $-100$) and the ground samples should then be packed in a vial by tapping the vial until further tapping causes no change in the meter reading. Same amounts of the sample should be used for each measurement. In the case of rods, they should be cleaned with a wire brush and examined for soundness. The rod must be free of visible voids, pits, etc.

As mentioned above, these procedures are normal in the art and are applicable with any instrument, consequently there is no necessity to describe them in greater detail. A person using the instrument of the present invention can himself establish the best procedure for his particular purpose.

Figure 2:
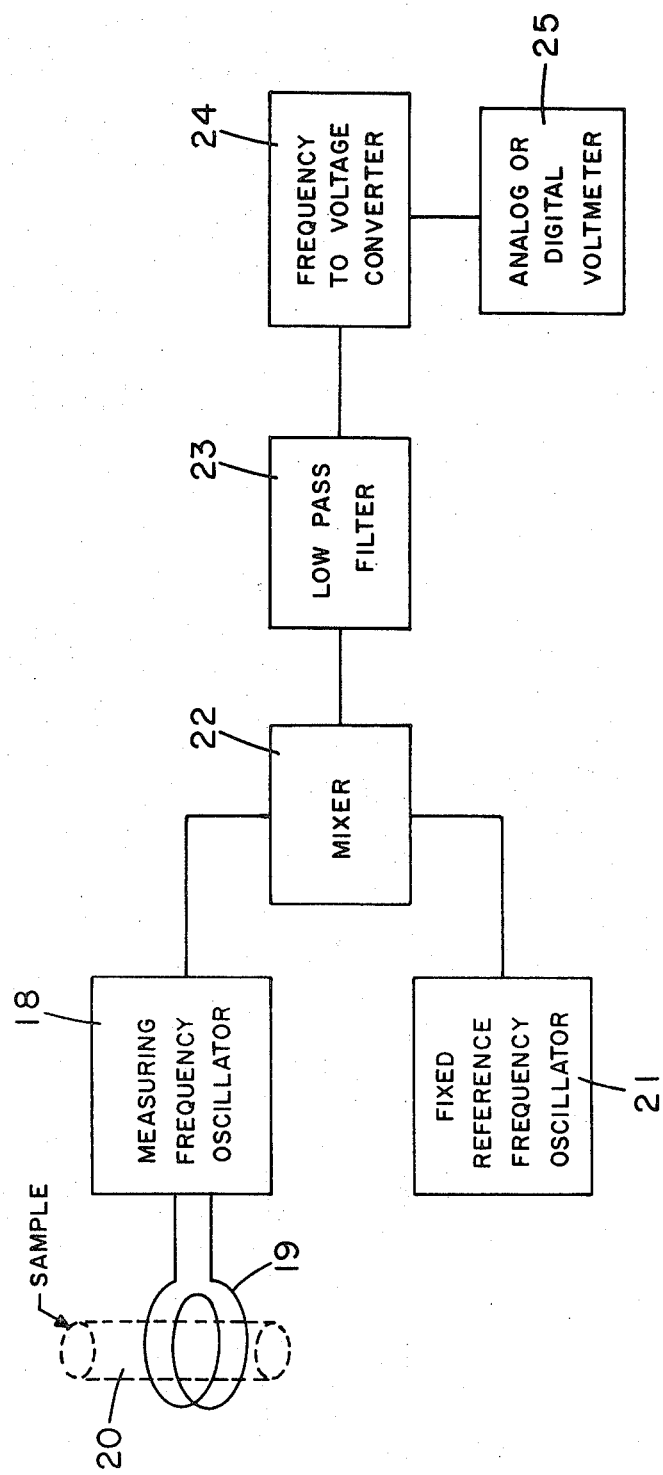
FIG. 2 is a block diagram of the apparatus according to the present invention using a fixed frequency reference oscillator.

FIG. 2 illustrates in the form of a block diagram the solid state electronic circuit which is mounted within the apparatus 10 of the present invention in order to obtain the desired measurements. In this circuit, the measuring frequency oscillator 18 comprises a coil 19 adapted to receive sample 20 therewithin. The fixed reference frequency oscillator 21 is employed here to provide a fixed reference frequency which is exactly equal to the basic frequency (when there is no sample in the coil 19) of the measuring frequency oscillator 18.

The two sine wave signals from the oscillators 18 and 21 are fed into a mixer circuit 22. When the signals have the same frequency, they annul one another, and the output of the mixer is zero. If the frequency of the measuring oscillator changes (decreases) due to the presence of magnetic material in the sample 20, the output of the mixer 22 will then be the differential frequency. This signal is fed to a low pass filter 23 to reduce traces of the original oscillator frequencies. The filtered differential frequency can be measured directly by means of a digital counter (not shown in this diagram) or it can be converted to a voltage signal in a frequency to voltage converter 24 and measured with an analog or digital voltmeter 25.

Figure 3:
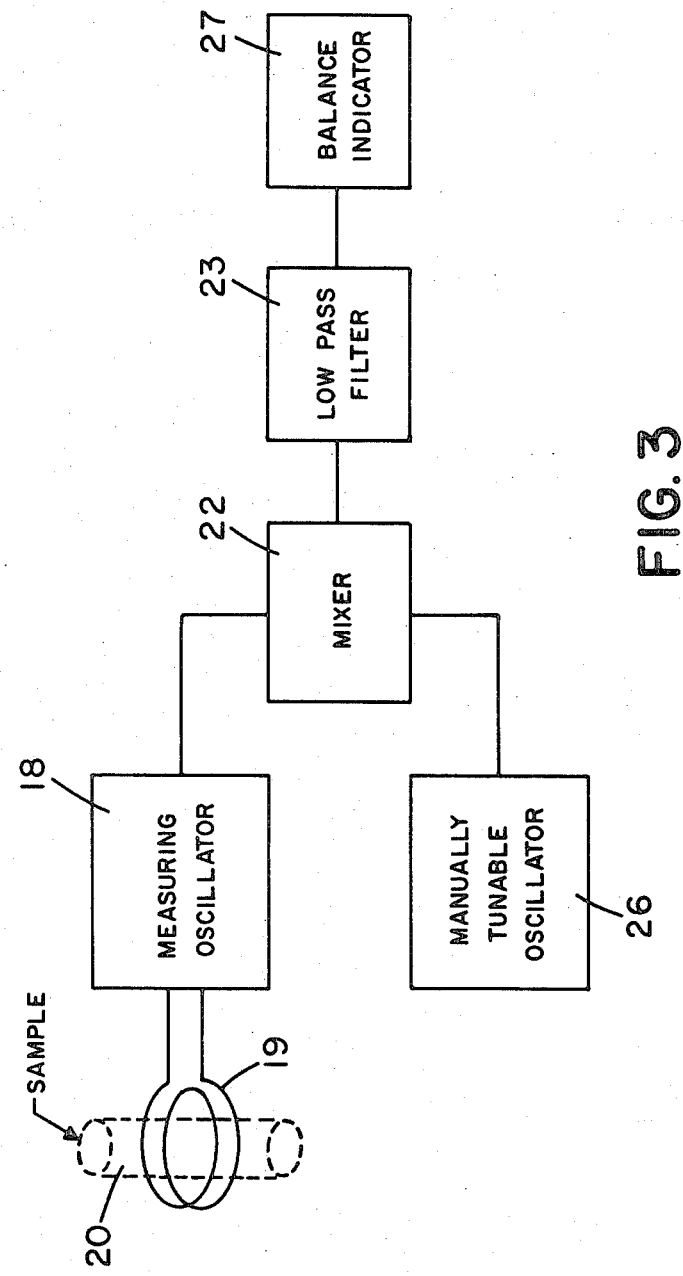
FIG. 3 is a block diagram of the apparatus according to the present invention using a manually tunable reference oscillator.

FIG. 3 illustrates a block diagram similar to that shown in FIG. 2, however, it uses a manually tunable reference oscillator 26 instead of the fixed reference frequency oscillator 21 and a balance indicator 27 instead of the frequency to voltage converter 24 and the voltmeter 25. It may be considered that this embodiment is slightly less advantageous than the one shown in FIG. 2 because it introduces an additional step, namely the manual tuning of the reference oscillator. On the other hand, this method is less sensitive to mechanical shock and vibration because of the absence of a voltmeter with its sometimes sensitive moving coil and pointer system. It is therefore more rugged and better adapted to use in the field.

Figure 4:
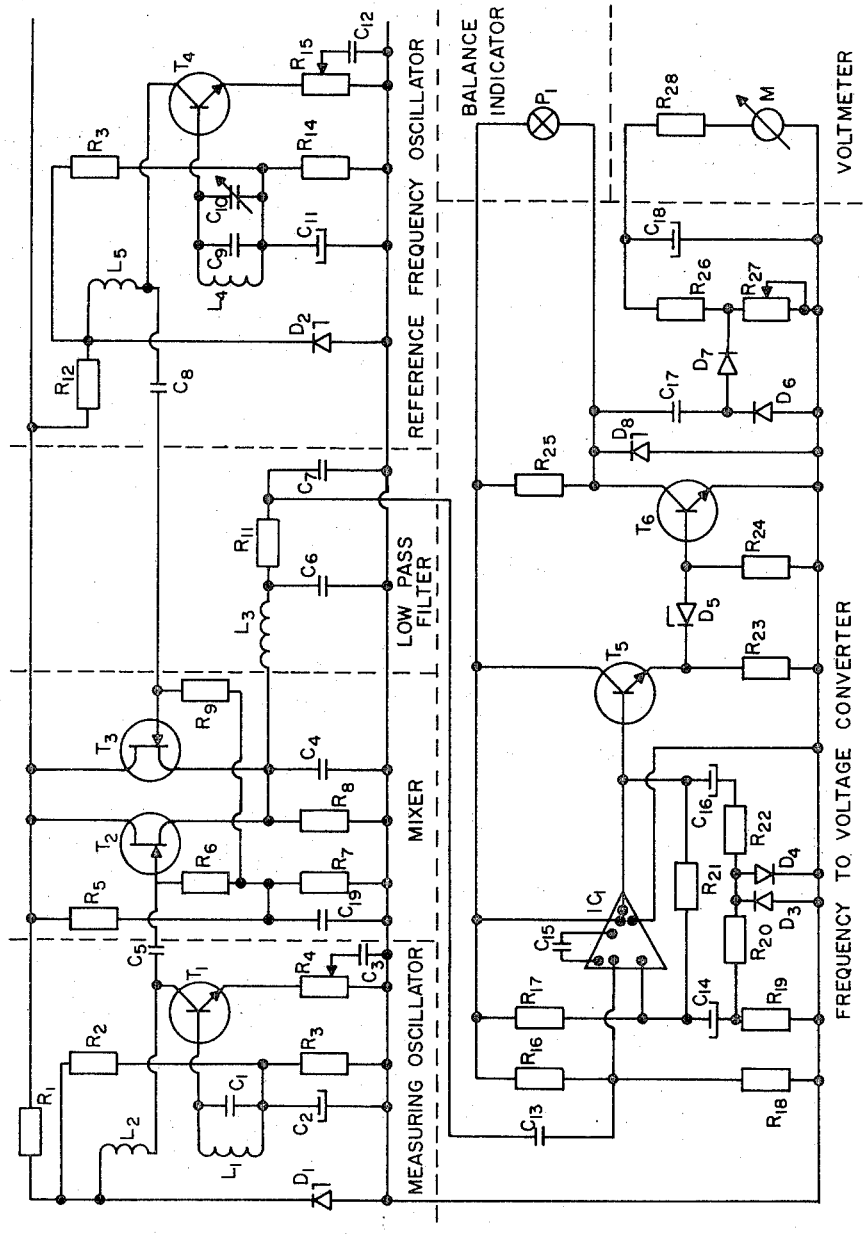
FIG. 4 is a circuit diagram of the apparatus according to the present invention.

FIG. 4 shows the detailed circuit diagram of the apparatus of the present invention, illustrating the circuits of the measuring oscillator, of the reference frequency oscillator, and of the frequency to voltage converter with voltmeter or balance indicator. The frequency of the measuring oscillator is determined by the inductance of sample coil $L_1$ and capacitance $C_1$. The frequency stability is improved by a Zener diode $D_1$. Of course, if the sample is placed in a suitably designed oscillator coil forming part of the circuit of the measuring oscillator, this sample, if it has magnetic properties, will increase the inductance of the coil. The increased inductance will decrease the frequency of the oscillator and the frequency change or shift $\Delta f$ will be proportional to the amount of magnetic material in the sample inside the coil.

The reference frequency oscillator is similar to the measuring oscillator although if higher stability is required, a conventional crystal oscillator can be used with an rms output of 0.5 to 3 volts.

Field effect transistors may be used in the mixer to prevent synchronization of the oscillators. Any sychronization would cause inaccuracies in the measuring range close to the balance point (equal measuring and reference oscillator frequencies).

The low pass filter is conventional, and a suitable commercial filter can be used.

The frequency to voltage converter can be of any desired type, however, the one illustrated herein is in itself novel in design. An integrated circuit operational amplifier is used. The DC feedback $R_{21}$ keeps the DC amplification at unity. The AC feedback $R_{22}$, $R°$ and $R_{19}$, together with silicon diodes $D_3$ and $D_4$, provides non linear sensitivity. Thus, amplification increases with the AC input voltage. This is useful to cut down traces of the basic oscillator frequencies not entirely eliminated by the low pass filter. The differential frequency is overamplified to obtain a square-wave output. The Zener diode $D_5$ conducts only if a differential frequency signal is present. Transistor $T_6$ provides a low impedance square-wave output the amplitude of which is limited by the Zener diode $D_8$. The square-wave signal is differentiated by $C_{17}$ and $R_{27}$, and the negative half cycles are eliminated by a diode circuit $D_6$, $D_7$. The resulting uniform positive signals will pulse at a rate which changes with the differential frequency, thus a linearly increasing frequency will linearly increase the voltage of the capacitor $C_{18}$. This voltage is measured by the voltmeter $M_1$. If a balance indicator is used, a suitable pilot light $P_1$ or sound indicator can be connected in parallel with resistor $R_{25}$.

The meanings of the various letter designations are as follows:
R — resistor
C — capacitor
L — coil
D — diode
T — transistor
M — voltmeter
P — pilot light The types of resistors, capacitors, etc., are indicated by the symbols used; these are standard and they and their functions as well as other details of the illustrated circuit will be readily apparent to those conversant with electonics.

Figure 5:
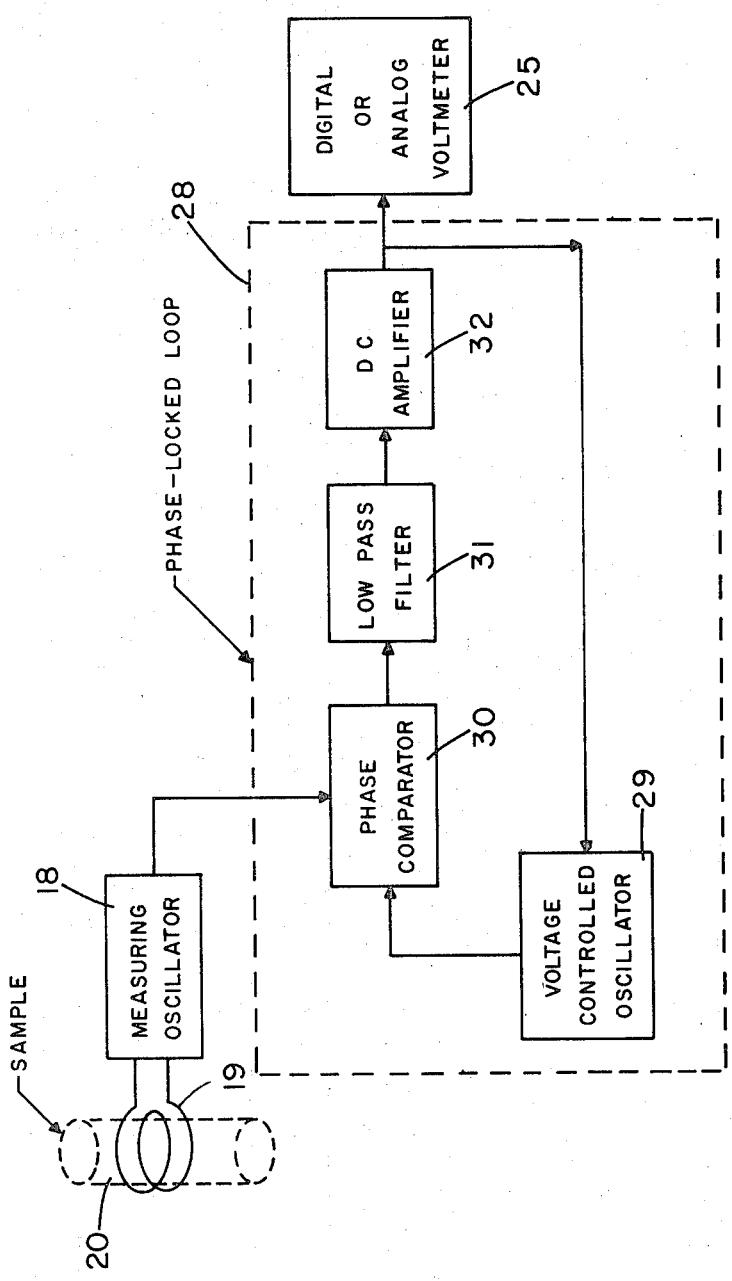
FIG. 5 is a block diagram of the apparatus according to the present invention using the phase-locked loop integrated circuit.

FIG. 5 shows the block diagram of still another embodiment of the present invention using a phase-locked loop integrated circuit 28. In this arrangement the measuring oscillator 18 without a sample provides an AC signal with $f_o$ free running frequency. The phase-locked loop integrated circuit has a voltage controlled oscillator 29 which is set to the same frequency by an RC network. When a magnetic sample 20 is introduced within coil 19, the frequency of the measuring oscillator 18 shifts $\Delta f$. The output of the measuring oscillator becomes $f_o - \Delta f$. Phase comparator 30 provides an error signal if the two incoming frequencies differ. This error signal is separated from the fundamental frequencies of the two oscillators by low pass filter 31 and amplified by DC amplifier 32. The amplified error signal is fed back to the voltage controlled oscillator 29. In this way, the voltage controlled oscillator 29 is forced to follow the frequency of the measuring oscillator. As the DC error signal is a linear function of $\Delta f$ frequency shift, with a simple connection of a digital or analog voltmeter 25 the amount of magnetic compound can be measured.

Figure 6:
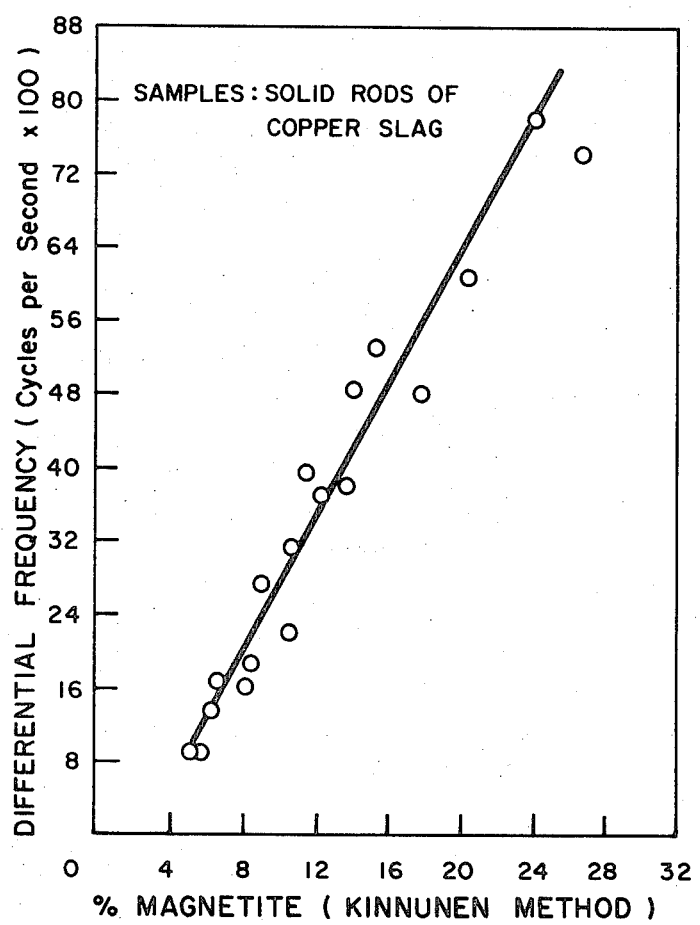
FIG. 6 is a graph illustrating the linear relationship existing between the differential frequency obtained by the apparatus of the present invention and the percent magnetite obtained by the chemical Kinnunen method.

FIG. 6 shows the linear relationship that exists between the differential frequency measured by an apparatus according to the present invention (cylcles/second multiplied by 100(cycles/second with respect to the percent magnetite in the sample as determined by the Kinnunen chemical method. This has been established for solid rods of copper slag samples.

Figure 7:
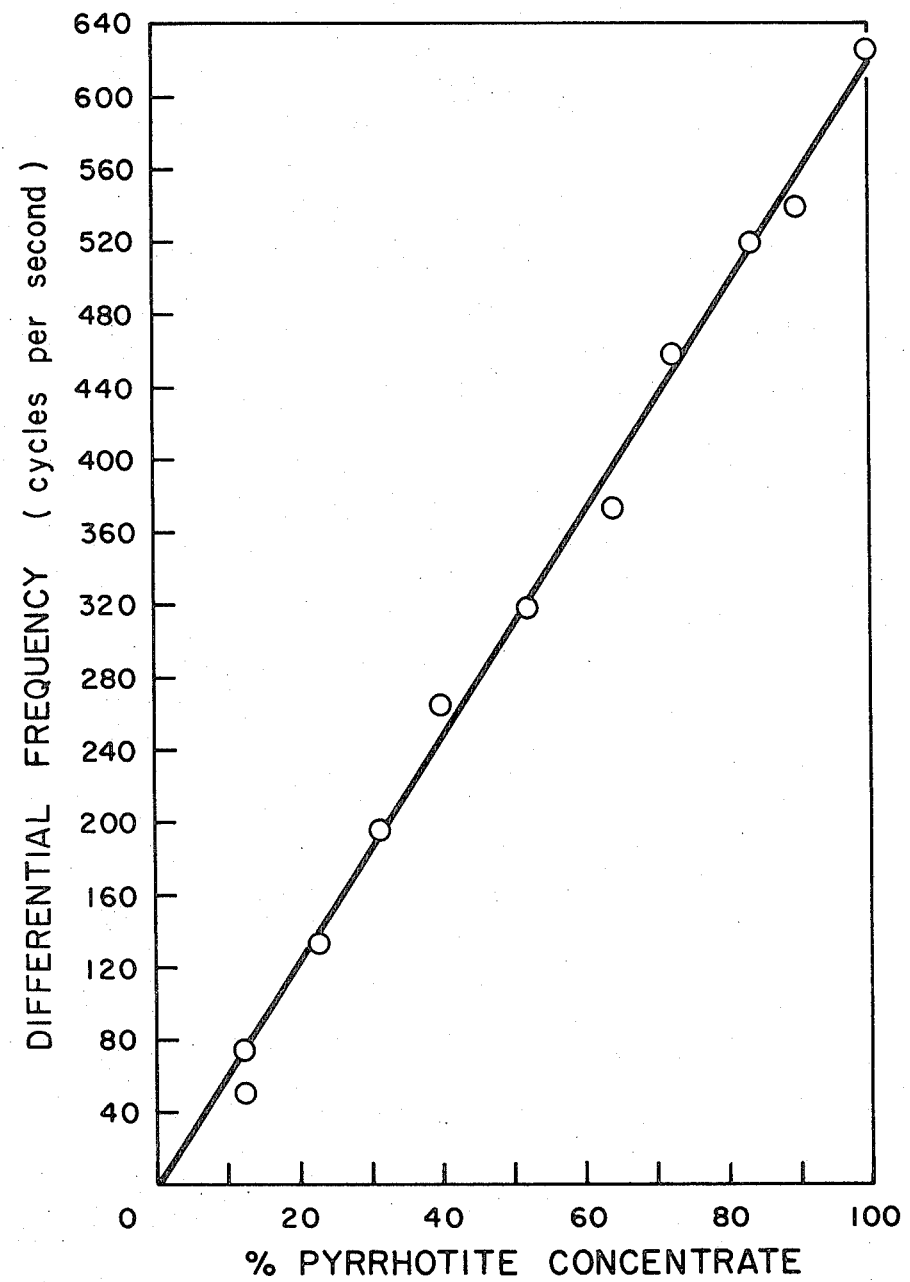
FIG. 7 is a graph showing the linear relationship existing between the differential frequency obtained by the apparatus of the present invention and the percent of pyrrhotite concentrate existing in the sample.

FIG. 7 shows the linear relationship that exists between the differential frequency established by the apparatus of the present invention (cycles/second) with respect to the percent pyrrhotite concentrate in samples of pyrrhotite concentrate-silica sand mixtures.

Figure 8:
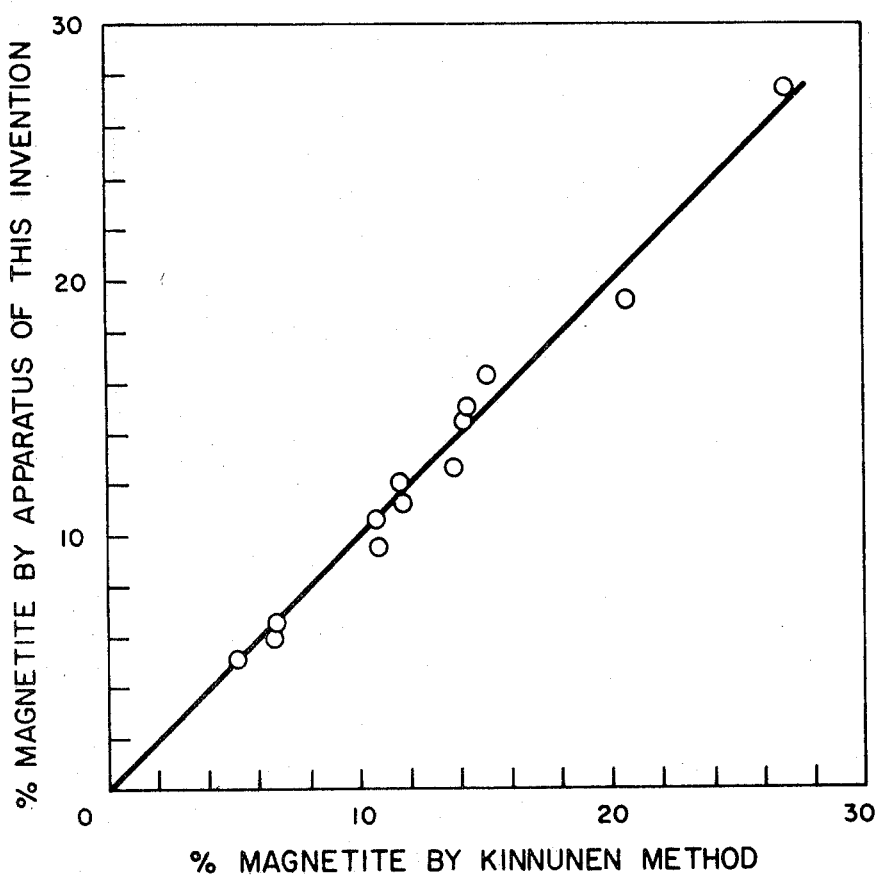
FIG. 8 is a graph demonstrating good comparative results as obtained by the apparatus of the present invention and by Kinnunen method.

Finally, FIG. 8 shows a good relationship existing between the percent magnetite established by the apparatus of the present invention and the percent magnetite established by the chemical Kinnunen method for various slag samples.

To summarize, the apparatus of the present invention employs a novel circuit for the determination of magnetic materials by a novel magnetic susceptibility principle. The primary signal is a differential frequency, proportional to the quantity of magnetic material in the sample, which is converted to a series of impulses which in turn are converted to a voltage signal or are read directly by means of a digital counter. The use of frequency signals rather than amplitude signals is novel and provides many advantages outlined above. Perhaps the most important of these advantages is the fact that fluctuations in the supply voltage and electrical noise have no effect on the measurements. The circuit is completely solid state and uses the newly developed field effect transistors or phase-locked loop integratd circuit. The circuit therefore displays extreme stability and negligible temperature sensitivity.

We claim:

1. Apparatus for determining the amount of magnetic material in a sample comprising:
   a. a measuring frequency oscillator including an oscillator coil adapted to receive the sample therewithin;
   b. a reference frequency oscillator;
   c. a mixer circuit into which sine wave signals from both the measuring frequency oscillator and the reference frequency oscillator are fed, and providing a differential frequency output corresponding to the frequency shift $\Delta f$ of the oscillator caused by the magnetic material of the sample;
   d. a low pass filter into which the signal from the mixer circuit is fed for reducing traces of the original oscillator frequencies;
   e. a frequency to voltage converter for converting the filtered differential frequency into a corresponding output voltage signal, said frequency to voltage converter including amplifier means in circuit relationship with said low pass filter for amplifying the signal output from said filter, and feedback means in circuit with said amplifer means for enabling said amplifier means to provide amplitude-sensitive amplification whereby said filter output signals are amplified an amount in inverse non linear relationship with respect to the amplitude of said filter output signals, said feedback means including resistance means in circuit with an input and an output of said amplifier means, and non linear diode means interconnecting said resistance means and electrical common for attenuating signals passing through said resistance means in inverse relationship with respect to the amplitude of signals at said output of said amplifier means, said resistance means including, a first resister in circuit with said output of said amplifier means, and a second resister in circuit between said first resister and said input of said amplifer means, and further comprising a third resister in circuit between said input of said amplifier means, said second resister and electrical common, said diode means coupled between said first and second resisters and electrical common, whereby amplification by said amplifier means increases with increased amplitudes of said filter output signals; and
   f. means for measuring the output of said frequency to voltage converter as an indication of the amount of magnetic material in the sample.

2. Apparatus according to claim 1 wherein said non linear diode means include silicon diodes.

3. Apparatus according to claim 2 wherein a cathode of a first of said diodes is connected in circuit between said first and second resistors and an anode of a second of said diodes is connected in circuit between said first and second resistors.

* * * * *

UNITED STATES PATENT OFFICE
CERTIFICATE OF CORRECTION

Patent No. 3,808,524          Dated April 30, 1974

Inventor(s) Peter Tarassoff and Frank Kitzinger

It is certified that error appears in the above-identified patent and that said Letters Patent are hereby corrected as shown below:

Column 5, line 60, change "R°" to read -- $R_{20}$ --;

Column 6, line 52, delete "(cycles/second" and substitute therefor -- ) --;

Column 8, lines 15, 16 and 17, 17, 19, 20 and 22, change the spelling of "resister" and "resisters" to read, respectively, -- resistor -- and -- resistors --.

Signed and sealed this 1st day of October 1974.

(SEAL)
Attest:

McCOY M. GIBSON JR.          C. MARSHALL DANN
Attesting Officer            Commissioner of Patents